(12) United States Patent
Frost

(10) Patent No.: US 7,567,667 B2
(45) Date of Patent: Jul. 28, 2009

(54) INMATE TELEPHONES HAVING INMATE-MOVABLE TELEPHONE BODIES

(75) Inventor: Harlie D. Frost, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 516 days.

(21) Appl. No.: 11/209,191

(22) Filed: Aug. 22, 2005

(65) Prior Publication Data

US 2007/0041581 A1    Feb. 22, 2007

(51) Int. Cl.
*H04M 1/00* (2006.01)
*H04M 9/00* (2006.01)

(52) U.S. Cl. ...................................... 379/434; 379/424
(58) Field of Classification Search ............ 379/428.01, 379/446, 453, 454, 455, 433.01, 365, 368, 379/434, 424, 425
See application file for complete search history.

(56) References Cited

U.S. PATENT DOCUMENTS

| | | | | |
|---|---|---|---|---|
| 4,875,234 A | * | 10/1989 | Tragatschnig | ................ 379/434 |
| D414,179 S | * | 9/1999 | Ashkenazi | .................. D14/146 |
| 6,009,169 A | * | 12/1999 | Styron | ......................... 379/453 |
| 6,512,828 B1 | | 1/2003 | Styron | |

* cited by examiner

*Primary Examiner*—Curtis Kuntz
*Assistant Examiner*—Phylesha Dabney
(74) *Attorney, Agent, or Firm*—Toler Law Group

(57) ABSTRACT

An inmate telephone for use by inmates of a prison or a mental institution comprises a housing having an opening and a telephone body supported within the housing. The telephone body supports an earpiece and a mouthpiece. The telephone body may have an inmate-adjustable portion that extends out of the opening and is movable to an inmate-adjustable position. The telephone body may have a generally spherical shape that is rotatable to an inmate-adjustable position relative to the housing. A height-adjustment mechanism may mount the telephone body to a wall of the prison or the mental institution to an inmate-adjustable height relative to the wall.

13 Claims, 5 Drawing Sheets

INMATE TELEPHONES HAVING INMATE-MOVABLE TELEPHONE BODIES

FIELD OF THE DISCLOSURE

The present disclosure is generally related to telephone systems for use by inmates of a prison or a mental institution.

BACKGROUND

Prison pay telephones are designed to mitigate a potential for inmates to physically harm themselves or others with their use. Some prison pay telephones are absent any inmate-accessible cords, such as a cord that would couple a handset to a body of the phone or a cord that would couple the phone to a telephone network. This prevents inmates from hanging themselves either directly on a cord or on clothes hung on the cord, and from pulling an element of the phone off the cord to use as a weapon.

To eliminate inmate-accessible cords, a prison pay telephone can be mounted to a wall, and can have its earpiece and mouthpiece mounted to a face of the telephone. Since this type of prison pay telephone has no handset to hang up, an on/off hook switch button is provided. The earpiece, the mouthpiece and the on/off hook switch button barely extend from the face of the telephone. U.S. Pat. No. 6,512,828 to Styron discloses an example of such a prison pay telephone.

DETAILED DESCRIPTION OF THE DRAWINGS

By mounting the earpiece and the mouthpiece in a fixed position, existing prison pay telephones are designed to be one-size-fits-all. Having a fixed height of the earpiece and the mouthpiece is not amenable for use by both tall inmates and short inmates. Having the earpiece and the mouthpiece flush with the wall, such as a steel wall, results in inmates placing their heads uncomfortably against the wall in order to talk and hear. To address these problems, embodiments of prison pay telephones having inmate-adjustable and jutting telephone bodies are disclosed herein. Housings of the telephone bodies constrain ranges of movement of the telephone bodies.

Further, the on/off hook switch button of existing prison pay telephones potentially may be used as a means for suicide or as a weapon. To address this problem, embodiments of an inmate pay telephone absent an inmate-accessible hook switch button or another type of inmate-accessible on/off button are disclosed herein.

All of the herein-disclosed inmate telephones are for use by inmates of a prison or a mental institution. Additionally, the herein-disclosed inmate telephones can be used in other user-restricted environments where a strong need for safety exists.

The herein-disclosed inmate telephones provide inmates access to a telephone network. Examples of the telephone network include, but are not limited to, a public switched telephone network, a Voice over Internet Protocol (VoIP) telephone network, a private branch exchange (PBX), and a virtual private network (VPN).

Figure 1A:
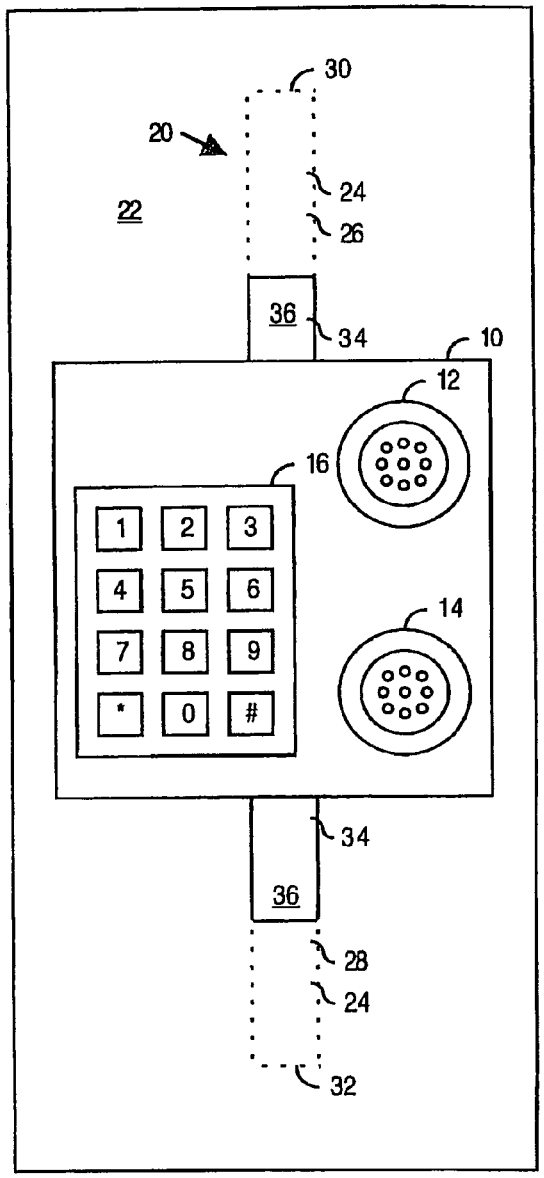
FIGS. 1a-1b show two positions of an embodiment of a height-adjustable inmate telephone.
Figure 1B:
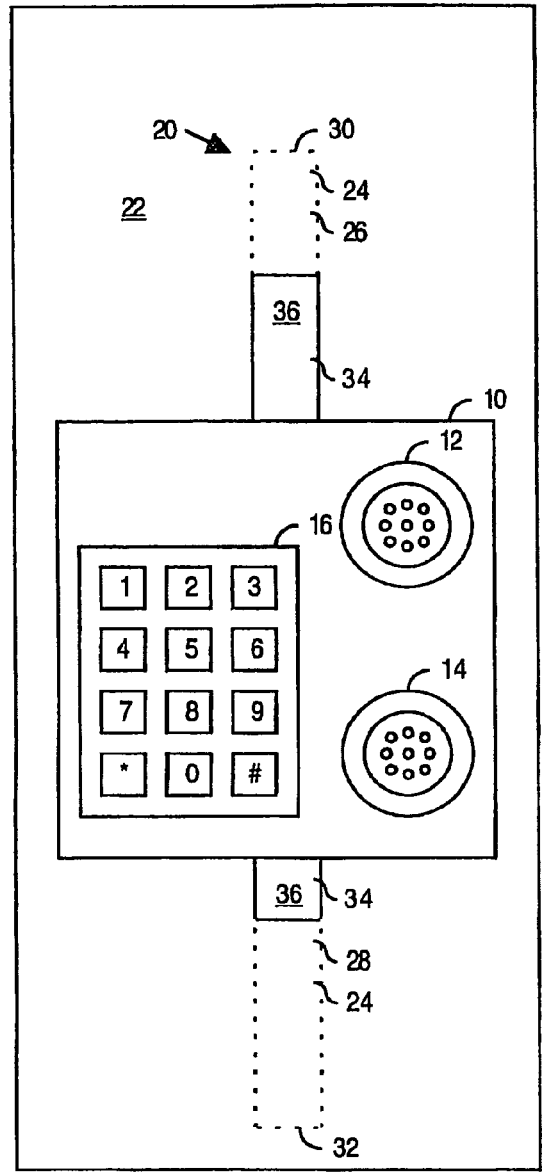

FIGS. 1a-1b show two positions of an embodiment of a height-adjustable inmate telephone. The inmate telephone comprises a telephone body 10 that supports an earpiece 12, a mouthpiece 14 and a dialing interface 16. The earpiece 12 and the mouthpiece 14 enable inmates to communicate in telephone calls with called and calling parties. The dialing interface 16 enables inmates to dial telephone numbers for placing outgoing telephone calls. Preferably, the earpiece 12, the mouthpiece 14 and the dialing interface 16 are mounted to or otherwise supported by the telephone body 10 without any inmate-accessible cords.

The inmate telephone further comprises a height-adjustment mechanism 20 that mounts the telephone body 10 to a wall 22 of a prison or a mental institution. Using the height-adjustment mechanism 20, an inmate can adjust a height of the telephone body 10 relative to the wall 22. For example, a taller inmate may raise the telephone body 10 to an elevated height shown in FIG. 1a before and/or during a telephone call facilitated using the inmate telephone. By contrast, a shorter inmate may lower the telephone body 10 to a lower height shown in FIG. 1b before and/or during a telephone call facilitated using the inmate telephone.

The height-adjustment mechanism 20 may comprise a vertical, sliding bar (not illustrated) along which the telephone body 10 translates when being raised or lowered. The height-adjustment mechanism 20 further comprises at least one shield 24 that slides as the height of the telephone body 10 is adjusted by inmates. The at least one shield 24 may comprise an upper shield 26 and a lower shield 28. By contrasting FIG. 1a to FIG. 1b, one can see that an end 30 of the upper shield 26 and an end 32 of the lower shield 28 are lowered/raised as the telephone body 10 is lowered/raised.

At least one portion 34 of the at least one shield 24 is exposed to the inmates through an opening 36. As the telephone body 10 is lowered or raised, a different portion of the at least one shield 24 is exposed to the inmates. However, the position of the opening 36 relative to the wall 22 remains fixed as the telephone body 10 is lowered or raised.

The at least one shield 24 is to shield an interior of the height-adjustment mechanism 20, an interior of the wall 22, and an interior of the inmate telephone throughout a full range of the inmate-adjustable height of the telephone body 10. The at least one shield 24 blocks inmates from accessing any internal components of the height-adjustment mechanism 20, the wall 22 and the inmate telephone through the opening 36. The range of the inmate-adjustable height of the telephone body 10 may be limited by the length of the opening 36.

The telephone body 10 may be jutting relative to the wall 22 so that an inmate can stand more comfortably with his/her ear and mouth at the earpiece 12 and the mouthpiece 14, and not be contorted with his/her shoulder pressed into the wall 22.

Figure 2A:
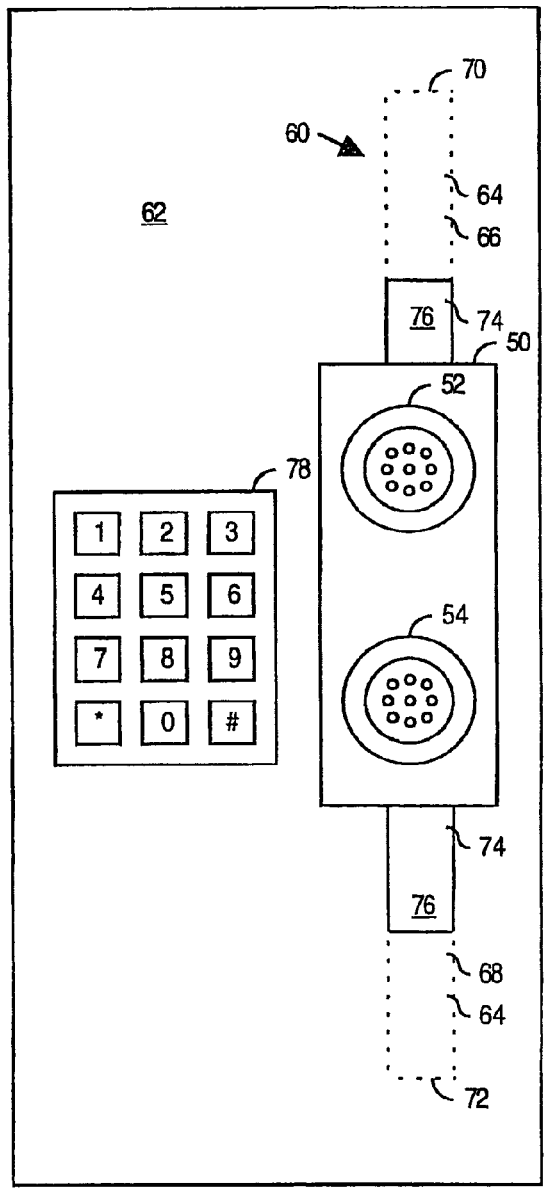
FIGS. 2a-2b show two positions of another embodiment of a height-adjustable inmate telephone.
Figure 2B:
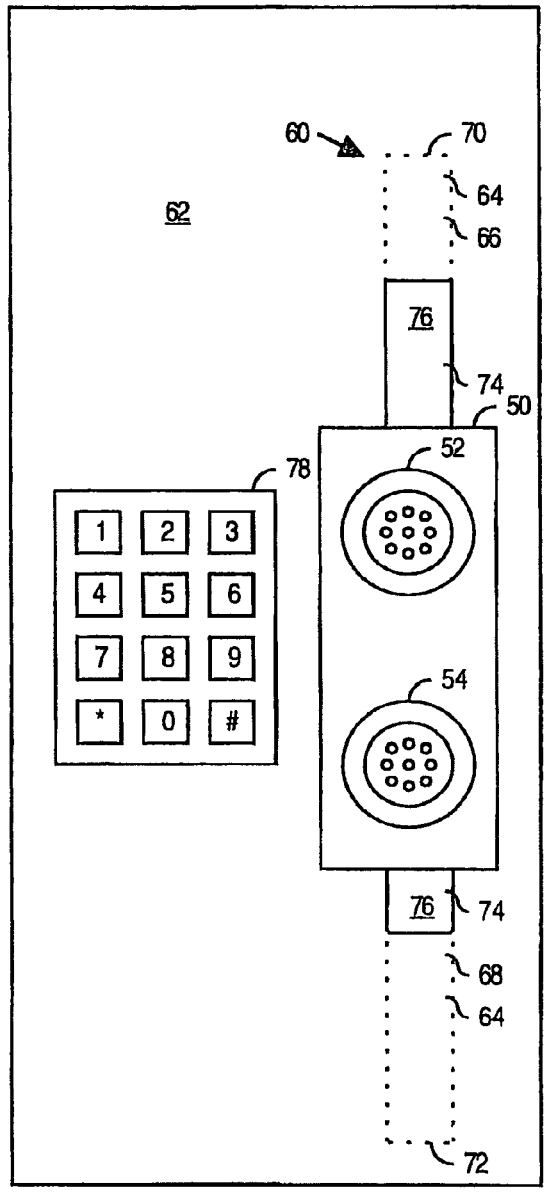

FIGS. 2a-2b show two positions of another embodiment of a height-adjustable inmate telephone. The inmate telephone comprises a telephone body 50 that supports an earpiece 52 and a mouthpiece 54. The earpiece 52 and the mouthpiece 54 enable inmates to communicate in telephone calls with called and calling parties. As illustrated, the earpiece 52 and the mouthpiece 54 are mounted to or otherwise supported by the telephone body 50 without any inmate-accessible cords.

The inmate telephone further comprises a height-adjustment mechanism 60 that mounts the telephone body 50 to a wall 62 of a prison or a mental institution. Using the height-adjustment mechanism 60, an inmate can adjust a height of the telephone body 50 relative to the wall 62. For example, a taller inmate may raise the telephone body 50 to an elevated height shown in FIG. 2a before and/or during a telephone call facilitated using the inmate telephone. By contrast, a shorter inmate may lower the telephone body 50 to a lower height shown in FIG. 2b before and/or during a telephone call facilitated using the inmate telephone.

The height-adjustment mechanism 60 may comprise a vertical, sliding bar (not illustrated) along which the telephone body 50 translates when being raised or lowered. The height-adjustment mechanism 60 further comprises at least one shield 64 that slides as the height of the telephone body 50 is adjusted by inmates. The at least one shield 64 may comprise an upper shield 66 and a lower shield 68. By contrasting FIG. 2a to FIG. 2b, one can see that an end 70 of the upper shield 66 and an end 72 of the lower shield 68 are lowered/raised as the telephone body 50 is lowered/raised.

At least one portion 74 of the at least one shield 64 is exposed to the inmates through an opening 76. As the telephone body 50 is lowered or raised, a different portion of the at least one shield 64 is exposed to the inmates. However, the position of the opening 76 relative to the wall 62 remains fixed as the telephone body 50 is lowered or raised.

The at least one shield 64 is to shield an interior of the height-adjustment mechanism 60, an interior of the wall 62, and an interior of the inmate telephone throughout a full range of the inmate-adjustable height of the telephone body 50. The at least one shield 64 blocks inmates from accessing any internal components of the height-adjustment mechanism 60, the wall 62 and the inmate telephone through the opening 76. The range of the inmate-adjustable height of the telephone body 50 may be limited by the length of the opening 76.

By contrast to the embodiment of FIGS. 1a-1b, a dialing interface 78 is mounted to the wall 62 of the prison or the mental institution without any inmate-accessible cords. The dialing interface 78 enables inmates to dial telephone numbers for placing outgoing telephone calls. The dialing interface 78 does not slide up and down as the telephone body 50 is raised and lowered.

The telephone body 50 may be jutting relative to the wall 62 so that an inmate can stand more comfortably with his/her ear and mouth at the earpiece 52 and the mouthpiece 54, and not be contorted with his/her shoulder pressed into the wall 62.

Figure 3A:
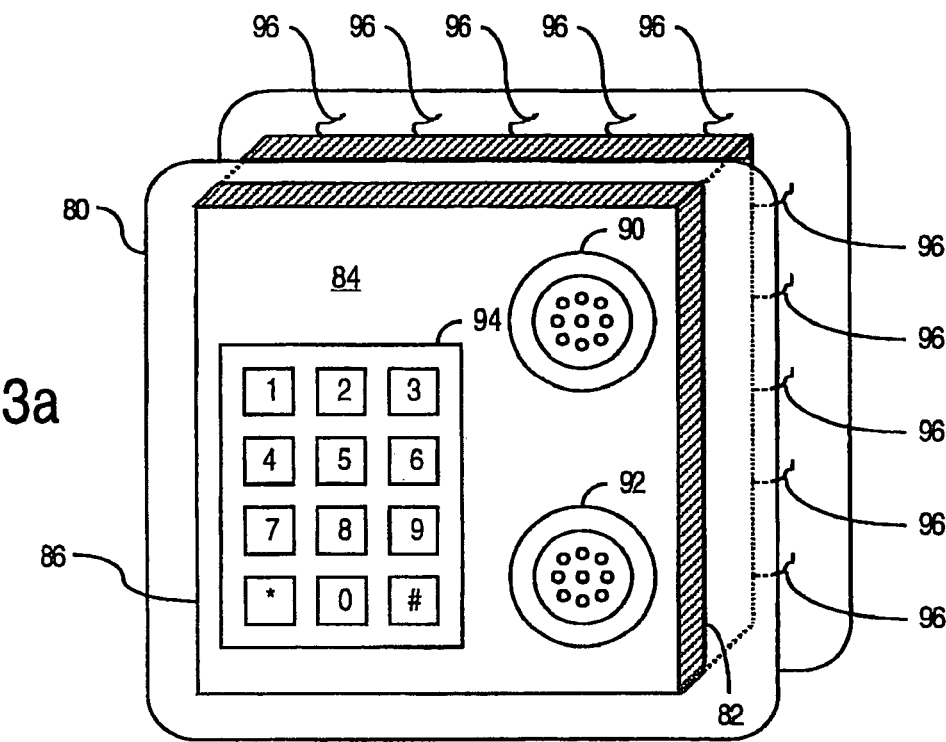
FIGS. 3a-3b show two positions of an embodiment of a depth-adjustable inmate telephone.
Figure 3B:
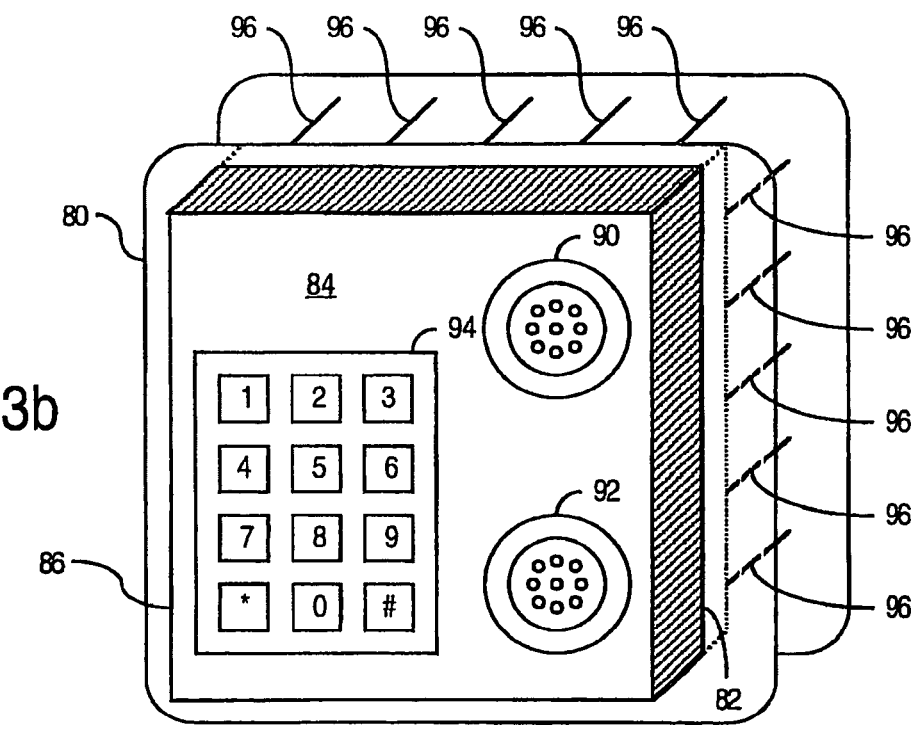

FIGS. 3a-3b show two positions of an embodiment of a depth-adjustable inmate telephone. The inmate telephone comprises a housing 80 having an opening 82, and a telephone body 84 supported within the housing 80. The telephone body 84 has an inmate-adjustable portion 86 that extends out of the opening 82. The inmate-adjustable portion 86 of the telephone body 84 supports an earpiece 90, a mouthpiece 92 and a dialing interface 94. The earpiece 90 and the mouthpiece 92 enable inmates to communicate in telephone calls with called and calling parties. The dialing interface 94 enables inmates to dial telephone numbers for placing outgoing telephone calls. As shown, the earpiece 90, the mouthpiece 92 and the dialing interface 94 are mounted to or otherwise supported by the telephone body 84 without any inmate-accessible cords.

The inmate-adjustable portion 86 is movable by inmates to various inmate-adjustable positions. An inmate can either pull the inmate-adjustable portion 86 toward himself/herself so that more of the telephone body 84 extends out of the opening 82. Alternatively, an inmate can push the inmate-adjustable portion 86 away from himself/herself so that less of the telephone body 84 extends out of the opening 82. The housing 80 can be mounted to a wall of the prison or the mental institution so that inmates can move the telephone body 84 (and thus the earpiece 90 and the mouthpiece 92) relative to the wall.

The inmate telephone optionally comprises a plurality of cords 96 that attach the telephone body 84 to the housing 80. The cords 96 restrain the movement of the telephone body 84 relative to the housing 80. Further, the cords 96 limit a fully extended position of the telephone body 84 through the opening 82 to a small distance. For example, FIG. 3a shows the cords 96 having slack in a depicted position of the telephone body 84 relative to the housing 80. By contrast, FIG. 3b shows the cords 96 being substantially taut when the telephone body 84 is substantially fully extended through the opening 82 by the small distance. In the substantially fully extended position, a portion of the telephone body 84 remains supported within the housing 80.

Regardless of the position of the telephone body 84, all of the cords 96 are inaccessible by inmates through the opening 82. The cords 96 may be enclosed within the housing 80, for example. Making the cords 96 inaccessible prevents clothing from being wound in the cords 96. Making top ones of the cords 96 too stiff and short to turn upside down also prevents clothing from being wound in the cords 96.

In some embodiments, the cords 96 are used solely for mechanical purposes, and are not used to power the inmate telephone or carry telephone communication signals (e.g. voice signals, ring signals, dial tone signals and dialing signals).

Optionally, an activation circuit places the inmate telephone in either an on-hook state or an off-hook state based on a position of the telephone body 84 relative to the housing 80. Inclusion of the activation circuit is of interest when the inmate telephone is absent an inmate-accessible hook switch button.

In some embodiments, the activation circuit places the inmate telephone in an off-hook state based on the inmate-adjustable portion 86 of the telephone body 84 being moved to at least one active position. In some embodiments, the at least one active position comprises the fully-extended position shown in FIG. 3b or a substantially fully-extended position. Optionally, the activation circuit supports multiple active positions so that each inmate can adjust the telephone body 84 to his/her own comfortable position.

To use the inmate telephone, an inmate can pull the telephone body 84 to an active position. This causes the inmate telephone to be placed in the off-hook state and a dial tone to be outputted by the earpiece 90. In response to the dial tone, an inmate can use the dialing interface 94 to dial a telephone number to initiate a telephone call. Optionally, the housing 80 includes an internal catch to hold the telephone body in the active position while the inmate leans his/her head onto the earpiece 90 and/or the mouthpiece 92. In this case, the inmate can pull the telephone body 84 until the internal catch is engaged, and then allow the telephone body 84 to slightly recede back into the housing 80.

To end the telephone call, the inmate can move the telephone body 84 to at least one inactive position other than the at least one active position. Optionally, the inmate slightly pulls the telephone body 84 to release the internal catch, and then returns the telephone body 84 into the housing 80. The activation circuit places the inmate telephone in an on-hook state based on the inmate-adjustable portion 86 of the telephone body 84 being moved to the at least one inactive position. The at least one inactive position may comprise a minimally-extended position, i.e. when the telephone body 84 is fully retracted into the housing 80, or a substantially minimally-extended position. Optionally, the activation circuit supports multiple inactive positions.

It is noted that the cords 96 depicted in FIGS. 3a-3b are for illustrative purposes only. The cords used in practice may be either of greater or lesser number, at the same or different locations, and with the same or different lengths than shown in FIGS. 3a-3b.

In contrast to having the dialing interface 94 supported by the telephone body 84, the dialing interface 94 can be mounted to the wall of the prison or the mental institution in an alternative embodiment.

Figure 4A:
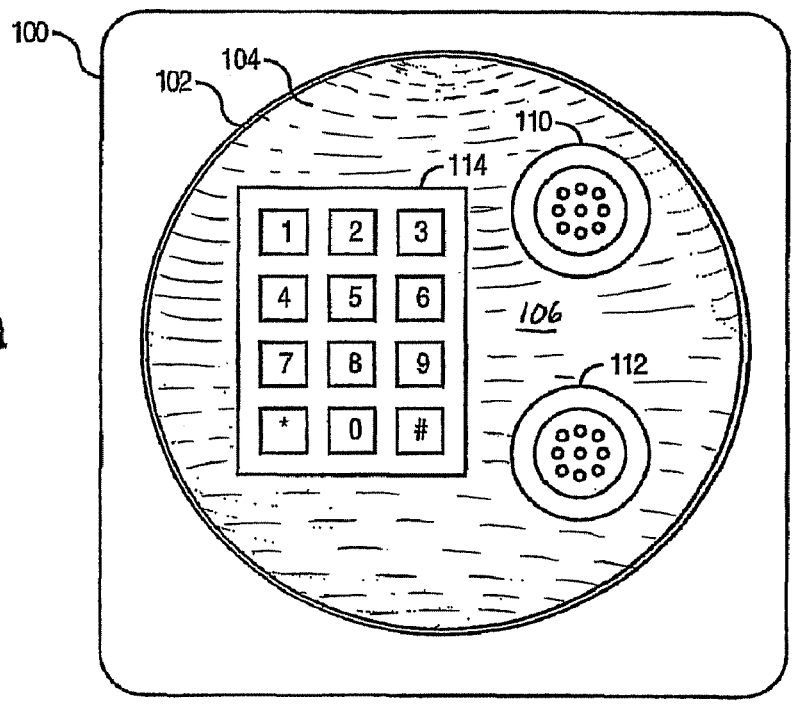
FIGS. 4a-4b show two positions of an embodiment of an orientation-adjustable inmate telephone.
Figure 4B:
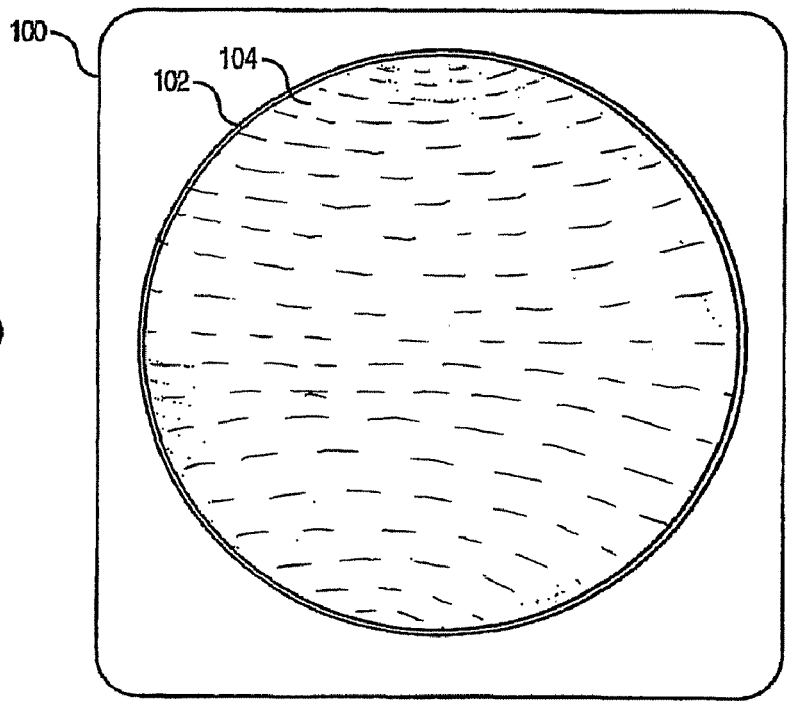

FIGS. 4a-4b show two positions of an embodiment of an orientation-adjustable inmate telephone. The inmate telephone comprises a housing 100 having an opening 102, and a telephone body 104 supported within the housing 100. The telephone body 104 has a generally spherical shape that is rotatable to an inmate-adjustable orientation relative to the housing 100.

FIG. 4a shows an orientation in which a portion 106 of the telephone body 104 extends out of the opening 102. The portion 106 supports an earpiece 110, a mouthpiece 112 and a dialing interface 114. The earpiece 110 and the mouthpiece 112 enable inmates to communicate in telephone calls with called and calling parties. The dialing interface 114 enables inmates to dial telephone numbers for placing outgoing telephone calls. Preferably, the earpiece 110, the mouthpiece 112 and the dialing interface 114 are mounted to or otherwise supported by the telephone body 104 without any inmate-accessible cords.

In the orientation of FIG. 4a, the earpiece 110, the mouthpiece 112, and the dialing interface 114 are exposed through the opening 102 to enable inmates to conduct telephone calls. By contrast, FIG. 4b shows an orientation of the telephone body 104 in which the earpiece 110, the mouthpiece 112, and the dialing interface 114 are rotated back into the housing 100 and are unexposed through the opening 102. Telephone calls are not conducted in the orientation of FIG. 4b.

The housing 100 can be mounted to a wall of the prison or the mental institution so that inmates can rotate the telephone body 104 (and thus the earpiece 110 and the mouthpiece 112) relative to the wall. The generally spherical shape of the telephone body 104 causes the earpiece 110 and the mouthpiece 112 to protrude some distance from the wall.

Optionally, an activation circuit places the inmate telephone in either an on-hook state or an off-hook state based on an orientation of the telephone body 104 relative to the housing 100. Inclusion of the activation circuit is of interest when the inmate telephone is absent an inmate-accessible hook switch button.

In some embodiments, the activation circuit places the inmate telephone in an off-hook state based on the telephone body 104 being rotated to at least one active position. Optionally, the activation circuit supports multiple active positions so that each inmate can adjust the telephone body 104 to his/her own comfortable position. In an illustrative embodiment, all of the multiple active positions have the earpiece 110, the mouthpiece 112, and the dialing interface 114 exposed through the opening 102 (e.g. FIG. 4a).

To use the inmate telephone, an inmate can rotate the telephone body 104 to an active position. This causes the inmate telephone to be placed in the off-hook state and a dial tone to be outputted by the earpiece 110. In response to the dial tone, an inmate can use the dialing interface 114 to dial a telephone number to initiate a telephone call.

To end the telephone call, the inmate can rotate the telephone body 104 to at least one inactive position other than the at least one active position. The activation circuit places the inmate telephone in an on-hook state based on the telephone body 104 being rotated to the at least one inactive position. The at least one inactive position may comprise one or more positions in which the earpiece 110, the mouthpiece 112, and the dialing interface 114 are unexposed through the opening 102 (e.g. FIG. 4b). The activation circuit may support multiple inactive positions.

Figure 5:
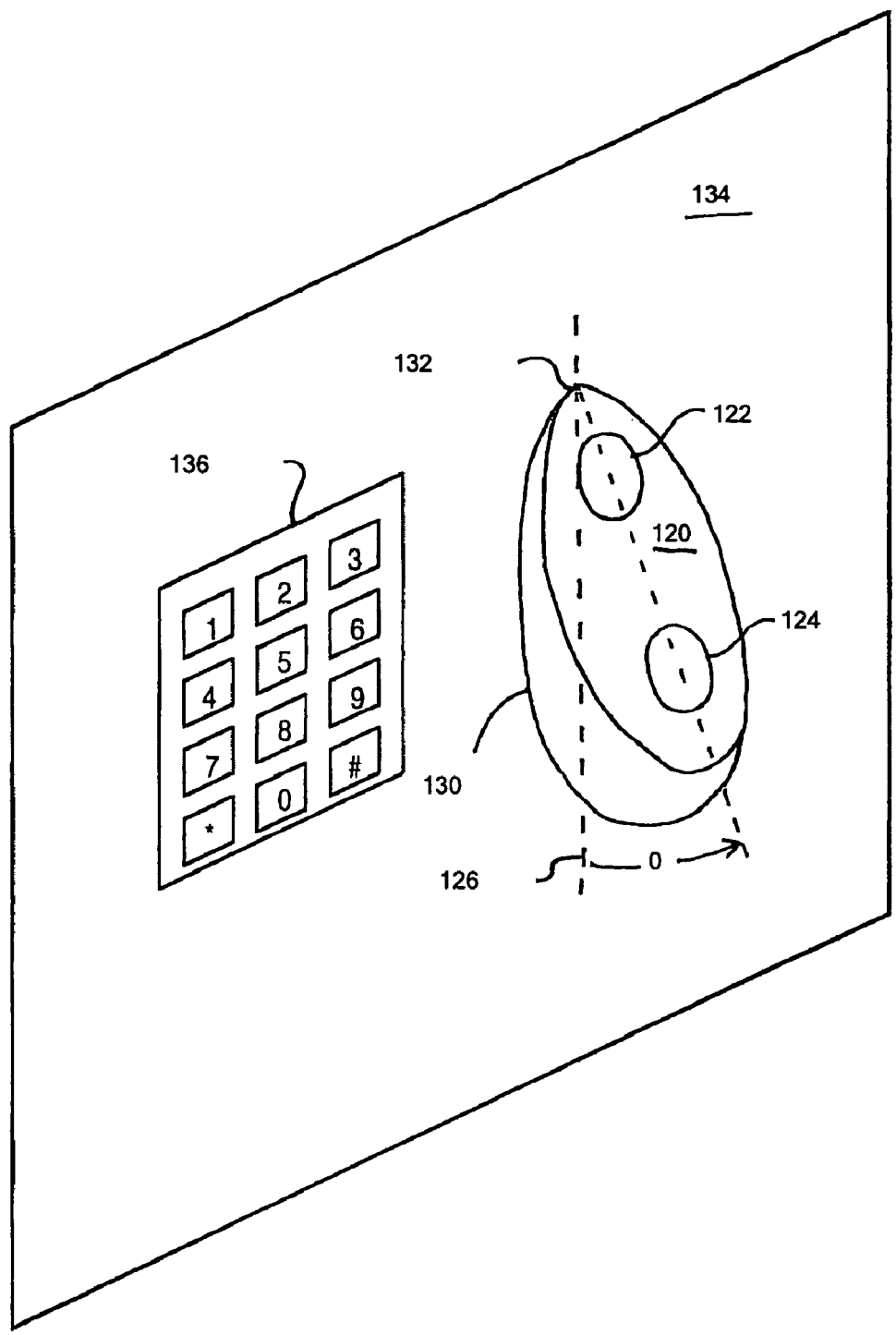
FIG. 5 is a perspective view of an embodiment of an inmate telephone having a sloped surface that supports an earpiece and a mouthpiece.

FIG. 5 is a perspective view of an embodiment of an inmate telephone having a surface 120 that supports an earpiece 122 and a mouthpiece 124. The surface 120 is part of a telephone body 126 that protrudes from a wall 130 of a prison or a mental institution. The telephone body 126 supports the earpiece 122 and the mouthpiece 124 without an inmate-accessible cord. The telephone body 126 has a generally rounded shape.

The telephone body 126 may be mounted to have a fixed position relative to the wall 130. In the fixed position, the surface 120 has a top portion 132 that meets or nearly meets the wall 130. The surface 120 is sloped at a slight, but non-zero angle θ relative to a vertical orientation 134.

A dialing interface 136 is mounted to either the wall 130 as illustrated or to the telephone body 126.

It is noted that various alternative embodiments are contemplated that combine teachings of the above-described embodiments. In general, alternative embodiments of an inmate telephone may be any combination of height-adjustable, depth-adjustable, orientation-adjustable and sloped based on the disclosure herein. For example, an inmate telephone may be both height-adjustable and depth-adjustable.

Further, any of the telephone bodies 10, 50 and 84 can have a more rounded shape in alternative embodiments. For example, any of the telephone bodies 10, 50 and 84 can have a rounded shape on top and around its sides. The large, rounded shape of the telephone bodies discourages gripping thereof by inmates. Additional protection can be provided by a strong bolt through a telephone body that allows the telephone body to turn under pressure to further discourage abuse.

As an alternative to the herein-disclosed on-hook and off-hook states, the activation circuits can place the inmate telephone in inactive and active states, respectively, in the manner disclosed herein. In the inactive state, the inmate telephone inhibits the inmate from making an outgoing call. In the active state, the inmate telephone enables an inmate to make an outgoing call.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   an inmate telephone for use by inmates of a prison or a mental institution, the inmate telephone comprising:
      a housing having an opening; and
      a telephone body supported within the housing, the telephone body having a generally spherical shape that is rotatable to an inmate-adjustable position relative to the housing, the telephone body supporting an earpiece and a mouthpiece that are exposed through the opening when the telephone body is rotated to at least one first position and are hidden from the opening when the telephone body is rotated to at least a second position.

2. The apparatus of claim 1, wherein the telephone body supports the earpiece and the mouthpiece without an inmate-accessible cord.

3. The apparatus of claim 1, wherein the inmate telephone is absent a discrete inmate-accessible hook-switch button and wherein the hook-switch function is performed by rotation of the telephone body.

4. The apparatus of claim 1, wherein the inmate telephone further comprises:
   an activation circuit to place the inmate telephone in an off-hook state based on the telephone body being rotated to the at least one first position, the activation circuit to place the inmate telephone in an on-hook state based on the telephone body being rotated to at least one second position other than the at least one first position.

5. The apparatus of claim 4, wherein the at least one first position comprises a plurality of positions for which the inmate telephone is in the off-hook state.

6. The apparatus of claim 4, wherein the at least one second position comprises a position for which the earpiece and the mouthpiece are unexposed through the opening.

7. The apparatus of claim 4, wherein the at least one second position comprises a plurality of positions for which the inmate telephone is in the on-hook state.

8. The apparatus of claim 1, wherein the inmate telephone comprises a dialing interface supported by the telephone body.

9. The apparatus of claim 1, wherein the housing is mounted to a wall of the prison or the mental institution so that an orientation of the telephone body is inmate-adjustable relative to the wall.

10. An apparatus comprising: an inmate telephone for use by inmates of a prison or a mental institution, the inmate telephone comprising:
   a housing having an opening;
   a telephone body supported within the housing, the telephone body having a generally spherical shape, a portion of the spherical shape extending outwardly from the housing opening, the telephone body being rotatable to an inmate-adjustable position relative to the housing, the telephone body supporting an earpiece and a mouthpiece that are exposed through the opening when the telephone body is rotated to at least one first position and are hidden from the opening when the telephone body is rotated to at least a second position; and
   an activation circuit to place the inmate telephone in an off-hook state when the telephone body is rotated to the at least one first position, the activation circuit to place the inmate telephone in an on-hook state when the telephone body is rotated to the at least one second position.

11. The apparatus of claim 10, wherein the at least one first position comprises a plurality of positions for which the inmate telephone is in the off-hook state.

12. The apparatus of claim 10, wherein the at least one second position comprises a position for which the earpiece and the mouthpiece are unexposed through the housing opening.

13. The apparatus of claim 10, wherein the at least one second position comprises a plurality of positions for which the inmate telephone is in the on-hook state.

* * * * *